May 29, 1956 W. C. SPEED ET AL 2,748,015

PRODUCTION OF MAGNETIC SOUND TAPE

Filed Dec. 21, 1950

INVENTOR
William C. Speed
James J. Dwyer
BY
Pennie, Edmonds, Morton, Barrows and Taylor
ATTORNEYS

United States Patent Office 2,748,015

Patented May 29, 1956

2,748,015

PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,991

4 Claims. (Cl. 117—7)

This invention relates to the production of magnetic tape from tape base of the moving picture sound type and has for its object certain improvements in the method of an apparatus for producing such tape as well as to the improved tape itself, as an article of manufacture.

In the production of moving picture sound film it is customary to photograph the picture on one film and the sound on another film. After editing, selected portions of the two films are combined to produce a composite film which is then used to make copies for exhibition purposes.

Referring more particularly to the sound film, a great many feet usually are "taken," but comparatively few are kept. While the proportions vary, it is not uncommon, for example, to discard 20 feet for every foot retained. Since the discarded portion cannot be reused, it is so much waste. This represents a very substantial loss.

With the recent advent of magnetic tape for sound recording and sound reproducing, it has been proposed to use such tape instead of the conventional sound film for the initial "take," to edit the tape, and to sound reproduce the finally selected portions while recording the sound photographically on conventional sound film. The latter film is then combined with the edited picture film, as before, to get a composite film. Since no more sound film is used than is required to photograph the edited sound, there is no waste of such film.

After the sound has been transferred to the film, the magnetically recorded sound is wiped off by de-magnetizing the tape. The tape may be used repeatedly, therefore, for further sound recording. Since there is no loss of tape or film, a very substantial saving in cost is indicated.

But, such has not been the result in practice. It is customary in the industry to use picture film and sound film with marginal sprocket holes and cameras for pictuers and sound with sprocket wheels to drive such film. This is necessary in order to synchronize the sound and pictures. Therefore, to utilize magnetic tape sound recording in photographic film sound recording, tape of the same width as the film (usually 35 or 16 mm.) is provided with similar sprocket holes along the margins.

Conventional magnetic tape contains a coating of very finely divided magnetic material on one of its flat surfaces extending completely from side to side. In preparing the magnetic tape with marginal sprocket holes for the moving picture industry, the same general procedure is followed. The tape base is coated from side to side with a layer of free-flowing magnetic material, such as magnetic oxide or iron, in a liquid vehicle, after which the coating is dried.

While excellent results are obtained with such tape so far as sound is concerned, they are almost disastrous so far as equipment is concerned. Sprocket wheel teeth and guides over which the magnetic tape is conducted are subject to an enormous amount of wear and tear caused by contact with the coating, which is highly abrasive. This is true of the sound-recording equipment as well as of the sound-reproducing equipment used to edit the sound and to transfer it to the film. This objectionable wear occurs wherever the equipment comes in frictional contact with the marginal portions of the coated tape, including the areas between and immediately adjacent the sprocket holes. Because of such damage to the equipment, the proposal to substitute magnetic tape for sound film in the recording of sound in the moving picture industry had made little progress.

The statement above, that excellent results are obtained so far as sound is concerned, is made with the further reservation that the tape itself must be excellent. Various tape base materials are used, such as paper, plastic, etc. The most common ones used today are paper and cellulose acetate. Various magnetic materials may be used for the coating. The one most commonly used is very finely divided magnetic oxide of iron produced synthetically. A dispersion of the magnetic material in a suitable vehicle or carrier is prepared, the vehicle usually containing a solvent.

To facilitate and to improve adherence of the magnetic material to the tape base, the surface of the tape base sometimes is pre-coated with a suitable adhesive material. During either or both coating operations, the tape base may be passed through a gap between a bottom support and the discharge opening of a feed hopper for the coating material, so that the coating is applied to the tape base as it moves thereunder.

No matter how carefully the tape base is made or how carefully the coating operation is conducted, difficulties arise which affect the results. The tape base itself may have an occasional pimple or berry-like projection on its upper or underside, or both; or a foreign particle may be deposited on or cling to the tape base. These obstructions interfere with the passage of the tape base under the coating hopper.

For example, an obstruction may strike the feed hopper or the bottom support, resulting in a tear of the tape base. When this happens magnetic material continues to be discharged from the hopper and spreads over the surrounding portions of the apparatus. The tearing of the tape base further complicates matters by making difficult the rejoining of the torn ends by splicing. Even though an obstruction should pass under the hopper without tearing the tape base, it may objectionably impair the quality of the magnetic coating. It may, for example, prevent the deposit of a coating of uniform thickness transversely across the tape base.

Difficulties and disadvantages of the kind discussed, and others, may for the most part be overcome in the practice of the present invention; as will be made clear on referring to the accompanying drawings, taken in conjunction with the following description, in which.

Figure 1:
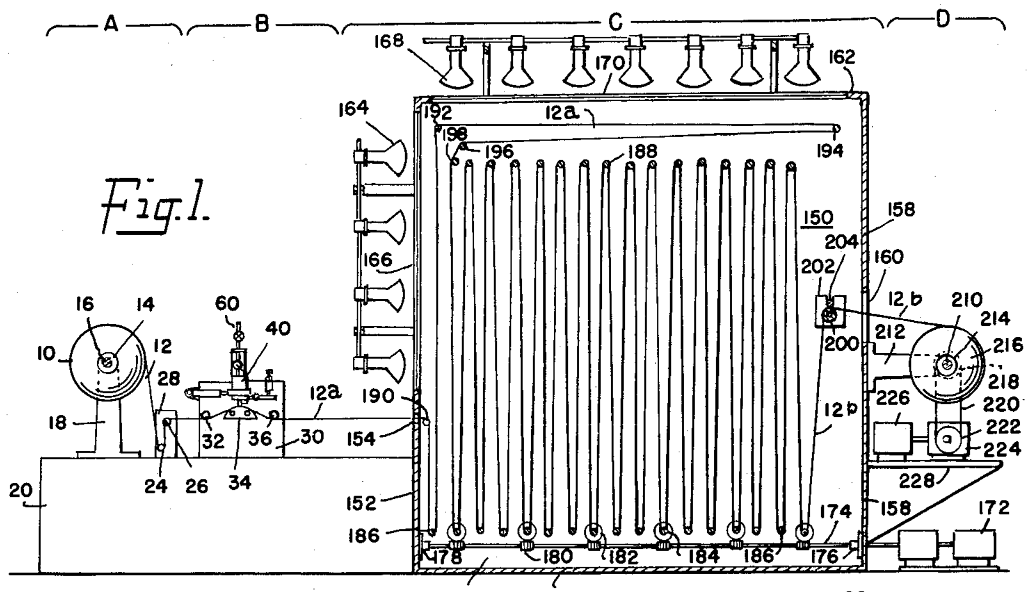
Fig. 1 is a side elevation, partly in section, of an apparatus illustrative of a practice of the invention.
Figures 2, 3, 4, 5:
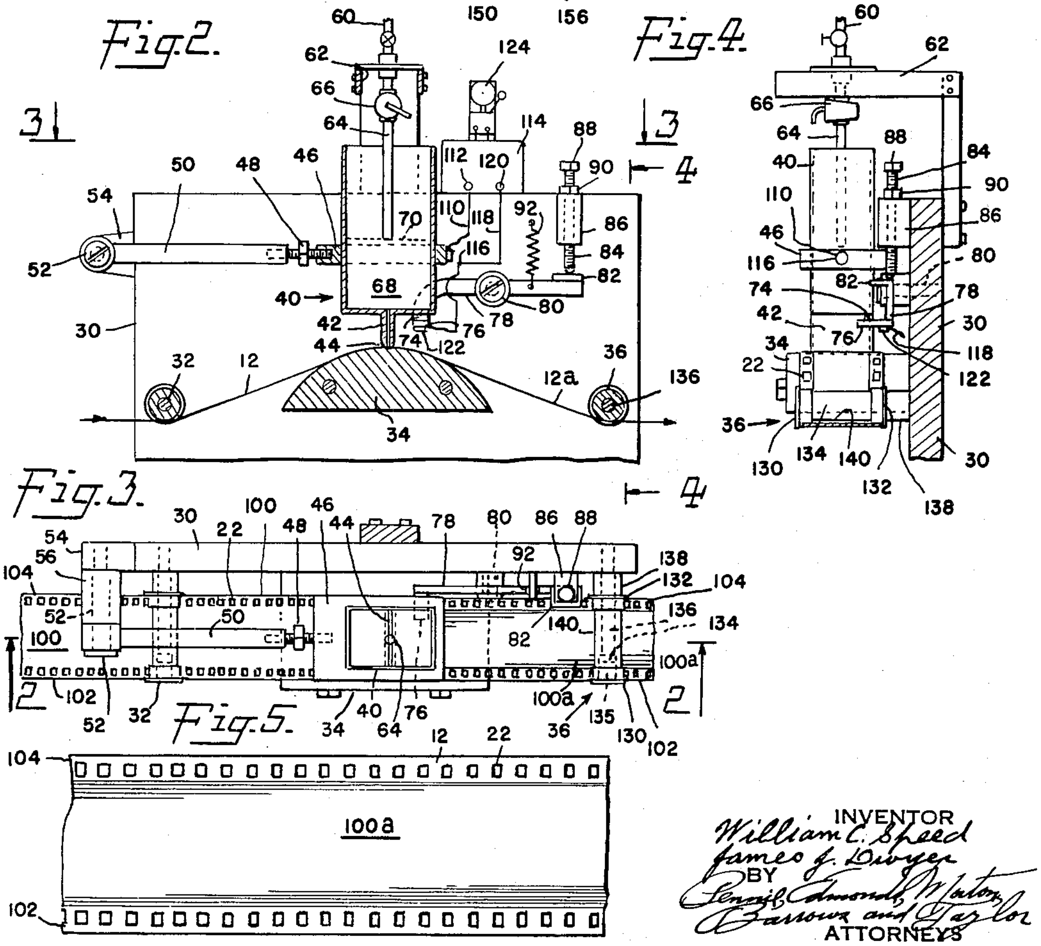
Fig. 2 is an enlarged side elevation, also partly in section, of the magnetic coating zone of the apparatus.

Figs. 3 and 4 are sections on the lines 3—3 and 4—4 of Fig. 1; and

Fig. 5 is a plan view of a portion of tape base coated in accordance with the invention.

Referring first to Fig. 1, it will be noted that the apparatus is divided into four main zones, reading from left to right: (1) tape base charging zone A; (2) tape base coating zone B; (3) coated tape base drying zone C; and (4) dried tape base winding zone D.

*Tape base charging zone A*

A roll 10 of tape base 12, on a hub 14 is shown mounted on a shaft 16 removably journaled in a pair of spaced standards 18 secured to a base 20 (Fig. 1). The tape base may be regarded as having a width of 35 mm. and marginal sprocket holes 22 (Figs. 5, 3, and 4). The tape base is threaded around the bottom of lower roller 24 (Fig. 1) and the top of an upper roller 26 secured at their far ends to a vertical support 28. Although not shown, braking means are advantageously associated with the shaft so that the tape base unwound from the roll may be placed under tension as it leaves the charging zone for processing in the successive zones.

*Tape base coating zone B*

Referring next to Fig. 2 particularly, the tape base coating zone includes a vertical support 30, also secured to base 20. A roller 32 is spaced from and in front of a bottom support 34. Another roller 36 is spaced from and in back of the bottom support. The lower levels of the rollers are below the top level of the bottom support so that the tape base may be held under tension as it advances under the front roller, over the bottom support, and under the second roller. The bottom support, it will also be noted, has a curved, convex, top to facilitate movement of the tape base thereover.

A feed hopper 40 is disposed directly above the bottom support. It is provided with a depending mouth portion 42 having rounded lips and a transverse discharge opening 44. The feed hopper is surrounded and supported by a frame 46 secured to one end of a threaded adjustable rod 48 with an intermediate nut, to locate the discharge opening at the crest of the bottom support. The other end of the rod is secured to the forward end of a laterally extending pivot arm 50. The other end of the arm is mounted pivotally on a fixed rod 52 secured at its far end to a bracket 54 attached to a vertical support 30. A spacer sleeve 56 is disposed between the bracket and arm to keep frame 46 and hence the feed hopper properly positioned over bottom support 34.

A valved upper conduit 60, supported by a bracket 62 fastened to vertical support 30, extends upwardly from the feed hopper; and communicates with a source of free-flowing magnetic material, not shown. The upper conduit also communicates with a lower conduit 64, having a control valve 66, depending in the feed hopper to maintain free-flowing magnetic material 68 at an optimum level 70.

In operation a gap of predetermined minimum height is maintained normally between bottom support 34 and discharge mouth 42 of the feed hopper to assure the deposition on the tape base of a layer of coating material of predetermined minimum thickness. Since the position of bottom support 34 is fixed, the arrangement is such as to permit raising of the feed hopper to increase the size of the gap to allow an obstruction on the tape base to pass therethrough without physical damage to the tape base.

To this end the bottom of the feed hopper rests normally on a contact member 74 carried on the end of lateral arm 76 secured to an adjustable insulated bracket 78 pivotally supported intermediate its ends on a rod 80 secured to vertical support 30. The rear end of the bracket terminates in a contact plate 82 on which bears the lower end of a threaded rod 84 mounted in a threaded hole of a sleeve support 86 attached to vertical support 34. The rod may be screwed up and down the sleeve with head 88 and locked in position with lock nut 90. A tension spring 92 is fastened at its lower end to the rear portion of the bracket and at its upper end to the vertical support.

It is clear from this construction that the contact member 74, and hence the feed hopper, may be moved up or down by a suitable turning of threaded rod 84, to fix the height of the gap between the discharge opening and the tape base. In this way the height of the gap is set so that a layer of magnetic material of predetermined minimum thickness may be deposited normally on the tape base as it moves through the gap.

In addition, the construction permits an increase in the height of the gap in order to permit an obstruction on the tape base to pass therethrough. Since the feed hopper is pivotally supported at 52, it is free to rise; and since contact member 74 on adjustable bracket 78 cannot normally be lowered, once the position of threaded rod 84 is fixed by lock nut 90, the increase in the height of the gap is obtained solely by the raising of the feed hopper. If it be assumed, for example, that an obstruction on the tape base is approaching the feed hopper, it will gradually be wedged between bottom support 34 and the rounded lips of mount portion 42, at discharge opening 44, of the feed hopper. As the obstruction rides up and over the curved or rounded bottom support, the feed hopper is thrust upwardly to permit passage of the obstruction through the gap.

By maintaining magnetic material 68 at its normal level 70 the feed hopper and its contents are easily raised in this manner. As the obstruction passes to the rear of mouth portion 42, the feed hopper returns to its former position; namely, in contact with contact member 74, thus restoring the gap to its normal minimum height.

As shown particularly in Figs. 3 and 4, discharge opening 44 of the feed hopper extends transversely over only the intermediate mid-portion 100 of the tape base thus depositing a layer **100*a* of magnetic coating material thereon (Fig. 5), but leaving the two marginal side portions 102 and 104, including sprocket holes 22**, free of magnetic coating material.

So far as increasing the height of the gap between bottom support 34 and the feed hopper is concerned, it makes no difference whether the obstruction is to the side or in the center of intermediate portion 100 of the tape base, or whether one or more such obstructions exist transversely of the tape base, they are adapted to raise the feed hopper without tearing the tape base whenever they contact the rounded lips of mouth portion 42; unless, of course, the obstruction is abnormally large, which is seldom the case.

Means are also provided for signaling the operator that such an obstruction has reached the feed hopper so that he may determine promptly by visual inspection the nature and extent of the obstruction and, if desired, place a suitable marking or marker, such as a tab, on the section affected so that it may be treated subsequently. This treatment usually takes the form of cutting out the affected section and suitably splicing the main ends. While such signal means may take various forms, the one now used in practice is substantially like the one disclosed in copending application, Ser. No. 201,974, filed Dec. 21, 1950, simultaneously herewith.

The feed hopper and contact member 74 (Fig. 2) are made of metal so that they can form a part of an electric circuit. A lead 110 connects a terminal 112 of a signal box 114 with a terminal 116 of the rear wall of the feed hopper. Another lead 118 connects a terminal 120 of the signal box with a terminal 122 of contact member 74. The signal box terminals in turn connect with a source of current.

As shown in Fig. 2 the circuit is closed. When it is broken by the raising of the feed hopper, thus breaking the contact between the bottom of the hopper and contact member 74, other relays, not here shown, are energized to cause an alarm, such as the ringing of bell 124, which attracts the operator's attention. He then determines the nature of the obstruction which caused the hopper to rise; and places a marker on the affected section so that it may be noted and removed later.

Before leaving the coating zone, further attention may be directed to the construction of rollers 32 and 36, because similar rollers are employed advantageously in the next, the drying zone. Referring to Figs. 3 and 4, it will be noted that each roller is in the form of a spool with a pair of spaced outer and inner end flange portions 130 and 132 and a sleeve portion 134, with a counter-sunk hole 135 in its near end, which is in turn rotatably mounted on a rod 136 secured at its far end to vertical support 30. A spacer 138 fits on the rod between the inner end flange portion and the vertical support.

The end flange portions provide an intermediate recess 140. The end flange portions are spaced freely to accommodate the tape base, so that the outwardly extending legs of the flanges act as side guides and the inwardly extending legs of the flanges act as tracks for marginal side portions 102 and 104, containing sprocket holes 22, of the tape base.

Intermediate portion 100 of the tape base, therefore, passes over intermediate recess 140, out of contact with sleeve 134 as well as end flanges 130 and 132. While this arrangement may not be important for roller 32 in front of the feed hopper, as tape base 12 approches the source of magnetic material, it is important for roller 36 in back of the feed hopper because fresh coating 100*a* on coated tape base 12*a* is thereby kept out of contact with the roller and hence is not damaged thereby as the coated tape base advances to the drying zone.

*Coated tape base drying zone C*

The drying zone is formed in general of a rectangular chamber 150 defined by a near end wall 152 with an entrance opening 154 for the incoming freshly coated tape base; a bottom 156; a far end wall 158 with an exit opening 160 for the outgoing dried coated tape base; and a top 162. The chamber is also provided with a near and far side wall, preferably having glass covered doors for visibility and ready access by the operator.

A battery of spaced radiant heaters 164, such as infra-red lamps, is mounted vertically adjacent a window 166 in the near end wall. A similar battery of radiant heaters 168 is mounted horizontally adjacent a window 170 in the top of the chamber.

A motor and speed-reducer 172 outside of the far end of the chamber connect with a drive shaft 174 mounted in journals 176 and 178 secured to the lower ends of the far and near end walls. The shaft is fitted with a plurality of spaced worm gears 180 in mesh with gears 182 mounted on driven lower rollers 184. A plurality of idler lower rollers 186 is in alignment with the driven rollers. A plurality of idler upper rollers 188 is in alignment near the top of the chamber, being complementary to the lower rollers. A roller 190 is located at entrance opening 154 in the near end wall; a roller 192 at the upper left hand corner of the chamber; a roller 194 at the upper right hand corner; and two diagonally placed rollers 196 and 198 near the upper left corner complete the system of rollers for the drying operation.

As already indicated, the rollers are preferably similar to rollers 32 and 36 in construction. Their use is especially desirable until the coating is substantially or wholly dried. With motor 172 in operation, coated tape base 12*a* with its fresh coating 100*a* advances through opening 154 into drying chamber 150, over roller 190, vertically downward around the first lower idler roller 186 in the series, vertically upward to and over roller 192, horizontally to the right around roller 194, horizontally to the left around diagonal rollers 196 and 198, vertically downward around the first driven roller 184 in the series, and up and down in this fashion until the tape base progresses to the right over all of the rollers while being subjected to the drying action of radiant heat from batteries 164 and 168 of infra-red lamps. The rate of drying of coating 100*a* depends, of course, on a number of variable factors, such as the rate of speed of the coated tape base, the number of lamps and the kind and intensity of their radiant heat, etc. In any case, the arrangement should be such that the tape base may advance through a sufficiently long path of travel to assure substantial or complete drying of the coating before it is brought into abrasive contact with one of the rollers or other physical guide.

The dried tape base finally passes between a pair of superposed gripping rollers 200 and 202. The lower roller is advantageously formed of a rubber cylinder mounted on a shaft, the ends of which are suitably supported in journals. The upper roller, made of steel, for example, preferably rests by gravity on the lower rollers, its ends resting in a pair of journal slots 204 so that the roller may rise and fall therein. Such an arrangement is described in more detail in said copending application. The rollers grip the dried tape base passing between them on its way through outlet opening 160 in far end wall 158 to the winding zone. This gripping action prevents the forward end of the tape base from springing back into the chamber, beyond the rollers.

*Dried tape base winding zone D*

Going next to the winding zone, it consists in general of a drive shaft 210 journaled in a pair of spaced brackets 212 attached to the far end wall. A hub 214 is removably attached thereto, on which dried and coated tape base 12*b* is power wound into a roll 216. Power is derived from a sprocket wheel 218 mounted on the far end of the shaft, a sprocket chain 220, a sprocket wheel 222 on the driven shaft of a speed reducer 224, connected to the drive shaft of a motor 226. The motor and speed reducer are secured to a platform 228. The motor is adapted to decrease its speed as the amount of tape base wound on the roll increases, so that the dried tape base is wound thereon as fast as it is moved through the drying zone by motor 172.

Various expedients may be employed to increase the height of the gap between the bottom support and the feed hopper beyond the established minimum to assure safe passage of the tape base with its obstructions therethrough during the coating operation. Basically, one is to move the feed hopper relatively to the bottom support; and another is to move the bottom support relatively to the feed hopper. In either case, the net result is to give the tape base more space at the moment it is required. Since a very small feed hopper may be used, it is feasible to move it relatively to the bottom support. Various structures, other than the specific one described, may be used to move the feed hopper. Similarly, various structures may be used to move the bottom support.

While numerous rollers, which are in effect also guides, of the type described are presently employed, it will be understood that some fixed guides similarly constructed may be used. That is to say, the fixed guides also have end flange-like portions and a recessed intermediate portion so that, as with the rollers, the marginal side portions of the tape base, containing the sprocket holes, may slide against the inwardly extending legs of the flanges and the magnetic coating on the intermediate portion of the tape base may be kept out of contact with the recessed intermediate portion of the guides.

While magnetic tape of the invention may have sprocket holes along both sides, like conventional 35 mm. and 16 mm. motion picture sound film, magnetic tape having sprocket holes along one side only is also contemplated, like conventional 8 mm. motion picture sound film. In the latter case, the marginal side portion with the sprocket holes is free of magnetic coating.

It will be clear to those skilled in this art that the above example is only by way of illustration, and that certain useful modifications are possible in the practice of the invention.

We claim:

1. In the method of producing magnetic sound-recording and sound-reproducing tape by passing a relatively long and narrow tape base of the moving picture sound type with marginal sprocket holes, which tape base has an obstruction thereon, while the tape base is under tension, successively through a coating zone and a drying zone, one flat surface of the tape base being coated with a layer of free-flowing magnetic material suspended in a liquid vehicle while moving through the coating zone and the coating being dried while moving through the drying zone, the improvement which comprises providing and maintaining in the coating zone a gap of predetermined minimum uniform height wider than the thickness of the tape base between a bottom support for the tape base and a superposed transverse liquid body of the free-flowing magnetic material, moving the tape base containing the obstruction through the gap with its bottom side in surface-to-surface contact with the top of the support in a generally horizontal direction and its top side normally out of contact with and at a predetermined minimum distance below the liquid body of magnetic material to assure a coating of predetermined thickness on the top side of the tape base, confining the application of the coating to the top surface of the tape base between the sprocket holes thereof, increasing momentarily the height of the gap in response to the obstruction on the tape base as the obstruction enters the gap by raising the source of magnetic material so that the obstruction may pass between the support and the liquid body of magnetic material without substantial physical damage to the tape base, restoring the gap to its former predetermined minimum uniform height by lowering the source of magnetic material as soon as the obstruction passes therethrough, depositing from the liquid body a layer of the magnetic material of predetermined thickness transversely across the top side of the moving tape base, the amount of increase in the height of the gap being no more than that necessary to permit passage of the obstruction through the gap so that the thickness of the coating adjacent each side of the obstruction, in the direction of travel of the tape base, is of the same uniform thickness as the coating on the remainder of the tape base, and passing the tape base thus coated with magnetic material to and through the drying zone.

2. Method according to claim 1 in which the tape base is moved over the bottom support in an arched path of travel and the magnetic material is deposited on the tape base at the crest of the arch.

3. Method according to claim 2 in which the tape base passes beneath guide surfaces at both the forward and rear sides of the crest of the arch, the guide surfaces are located at a level below the crest of the arch, and contact of the coated side of the tape base with such guide surfaces is confined to the uncoated marginal side portions of the tape base.

4. Method according to claim 1, in which the coated tape base is advanced a substantial distance through the drying zone in contact with a plurality of spaced supports, the contact between the coated tape base and the supports being confined solely to the un-coated bottom surface and the un-coated marginal side portions of the coated top surface to protect the coating.

References Cited in the file of this patent

UNITED STATES PATENTS

| | | |
|---|---|---|
| 328,958 | Maxfield | Oct. 27, 1885 |
| 970,972 | Thompson | Sept. 20, 1910 |
| 986,385 | Hanlon | Mar. 7, 1911 |
| 1,281,728 | Weinheim | Oct. 15, 1918 |
| 1,321,421 | Delany | Nov. 11, 1919 |
| 1,494,315 | Ostenberg | May 13, 1924 |
| 1,610,777 | Harvey | Dec. 14, 1926 |
| 1,653,467 | O'Neill | Dec. 20, 1927 |
| 1,667,408 | Allen | Apr. 24, 1928 |
| 1,764,423 | Stone | June 17, 1930 |
| 1,840,052 | O'Donnell | Jan. 5, 1932 |
| 1,871,790 | Hansen | Aug. 16, 1932 |
| 1,883,559 | Chipman | Oct. 18, 1932 |
| 2,017,459 | Howe et al. | Oct. 15, 1935 |
| 2,022,322 | Pelton | Nov. 26, 1935 |
| 2,195,101 | Swab | Mar. 26, 1940 |
| 2,321,938 | Quinn | June 15, 1943 |
| 2,384,657 | Tyler | Sept. 11, 1945 |
| 2,536,029 | Camras | Jan. 2, 1951 |
| 2,541,136 | Warren | Feb. 13, 1951 |
| 2,551,329 | Klemola | May 1, 1951 |